March 14, 1967  B. P. NITZSCHE  3,308,867
TIRE RIVETS
Filed May 6, 1965

INVENTOR
BERTHA P. NITZSCHE

Gerald P. Welch
ATTORNEY

1

3,308,867
TIRE RIVETS
Bertha P. Nitzsche, P.O. Box 207,
Stoughton, Wis. 53589
Filed May 6, 1965, Ser. No. 453,618
4 Claims. (Cl. 152—370)

This invention relates to improvements in tire plugs or rivets, and more particularly to a novel tire plug of pure crepe rubber.

An object of the invention is to provide a device of the type of pure crepe rubber which will flex, expand and contract with a tire in motion after it has been properly inserted therein and vulcanized in place with self-vulcanizing cement. One form of the invention is an improvement on my Patent No. 3,174,524, issued Mar. 23, 1965.

Another object of the invention is to provide a tire plug which does not require the application of heat, but which when inserted with self-vulcanizing cement will be vulcanized securely by the heat of the tire in use.

Other and further objects of the invention will appear as the description proceeds, reference being had to the accompanying drawing, in which.

Figure 1:
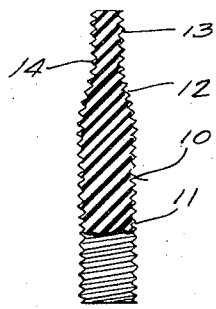
FIG. 1 is a view partly in vertical section and partly in elevation of one form of the invention.
Figure 2:
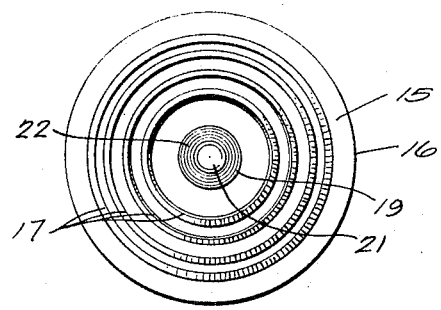
FIG. 2 is a plan view of a modification of the invention.
Figure 3:
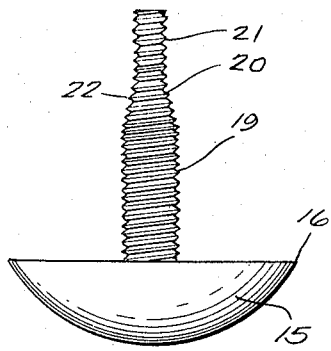
FIG. 3 is a side view in elevation of the same.
Figure 4:
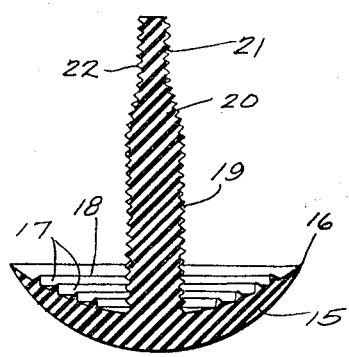
FIG. 4 is a vertical sectional view of the same.
Figure 5:
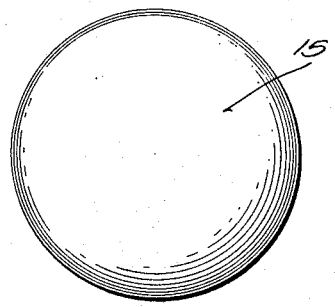
FIG. 5 is an inverted plan view thereof.

Referring more particularly to the drawing, both forms of the invention are constituted of pure crepe rubber, made of natural rubber polymers characterized by softness and extreme flexibility of such composition that when installed with self-vulcanizing solution, it will vulcanize in the tire, and in FIG. 1 a headless tire plug 10 is shown, comprising a body portion 11, a frusto-conical portion 12 integral therewith terminating at the top in a reduced portion 13, and a continuous helical thread as at 14 covering the entire plug from top to bottom.

The tire plug shown in FIGS. 2 to 5, inclusive, has a circular suction cup base with a peripheral feather edge 16.

The base 15 has a plurality of concentric ribs 17, the latter being triangular in cross-section presenting a relatively sharp upper edge as at 18. Centrally located on the base 15 is a stem formed of a body portion 19, an integral frusto-conical portion 20 terminating at its upper end in a reduced portion 21, said body portion, frusto-conical portion, and reduced portion being entirely covered by a helical thread 22.

In use, the threaded portion of the plug is covered with self-vulcanizing cement, as is the concave face of the base 15. The plug is then inserted into a tire puncture.

It will be understood that the device is capable of many modifications in structure and design, without departing from the spirit of the invention.

Having thus described the invention, what is claimed and desired to be secured by Letters Patent of the United States, is:

1. A tire rivet including a dished suction cup, a central elongated stem integral therewith, a helical thread on the entire length of said stem, a plurality of sharp ribs on the concave face of said suction cup, the entire unit being formed of crepe rubber.

2. A tire rivet including a dished suction cup base, a central elongated stem integral therewith, a reduced portion at the free end of said stem integral with a frusto-conical portion integral at its opposite end with the body portion of said stem, a helical thread covering the entire length of said stem, a plurality of sharp ribs on the concave face of said dished suction cup base, the entire unit being formed of crepe rubber to permit movement with a tire body in which it has been fixed.

3. In a device of the character described, a dished vacuum suction cup base, and a plurality of sharp concentric ribs on said base, said ribs being triangular in cross-section and formed with the base of crepe rubber.

4. A headless tire rivet formed of crepe rubber, an elongated body portion, a shorter reduced portion thereon, a frustro-conical portion integral with and connecting said body portion and said reduced portion, and a helical thread extending entirely over the body portion, the reduced portion and the connecting frustro-conical portion.

References Cited by the Examiner
UNITED STATES PATENTS

| | | | |
|---|---|---|---|
| 2,280,006 | 4/1942 | Peeifer | 152—370 |
| 3,174,524 | 3/1965 | Nitzsche | 152—370 |

FOREIGN PATENTS 831,501  3/1960  Great Britain.

ARTHUR L. LA POINT, Primary Examiner.
C. W. HAEFELE, Assistant Examiner.